United States Patent [19]

Yacobucci et al.

[11] Patent Number: 4,698,391

[45] Date of Patent: Oct. 6, 1987

[54] CROSSLINKED POLYMERS WITH LOWERED RESISTIVITY AND MATERIALS AND METHODS FOR THEIR PREPARATION

[75] Inventors: Paul D. Yacobucci; Thomas Albano, both of Rochester, N.Y.

[73] Assignee: Eastman Kodak Company, Rochester, N.Y.

[21] Appl. No.: 892,173

[22] Filed: Jul. 30, 1986

[51] Int. Cl.[4] ............................................. C08L 61/00
[52] U.S. Cl. .................................... 525/162; 252/500; 252/511; 525/190; 525/428; 525/443; 525/510; 525/523
[58] Field of Search ............... 525/162, 443, 916, 428, 525/190, 186, 523, 510; 252/500, 511

[56] References Cited

U.S. PATENT DOCUMENTS

| | | | |
|---|---|---|---|
| 2,832,747 | 4/1958 | Jackson | 525/916 X |
| 3,011,918 | 12/1961 | Silvernail et al. | 117/201 |
| 3,617,372 | 11/1971 | McNamee et al. | 117/201 |
| 3,674,711 | 7/1972 | Growald et al. | 252/500 |
| 3,798,032 | 3/1974 | Miller | 252/500 X |
| 3,804,668 | 4/1974 | Bakule et al. | 117/201 |

FOREIGN PATENT DOCUMENTS

| | | |
|---|---|---|
| 59-24706 | 2/1984 | Japan . |
| 59-24727 | 2/1984 | Japan . |
| 2066257B | 8/1983 | United Kingdom . |

*Primary Examiner*—Theodore E. Pertilla
*Attorney, Agent, or Firm*—David F. Janci

[57] ABSTRACT

New crosslinked polymers are prepared from a combination of starting materials comprising a polymer, a crosslinking agent for the polymer, and a conductivity agent containing a quaternary ammonium moiety. The conductivity agent contains at least one functional group which, during an otherwise typical process of crosslinking the polymer through the crosslinking agent, reacts to bond the conductivity agent covalently and pendently to the crosslinking agent or the polymer. The resultant crosslinked polymer has lower electrical resistivity due to inclusion of the conductivity agent.

11 Claims, No Drawings

CROSSLINKED POLYMERS WITH LOWERED RESISTIVITY AND MATERIALS AND METHODS FOR THEIR PREPARATION

FIELD OF THE INVENTION

The invention relates to crosslinked polymers that have a desired level of electrical resistivity and to methods and combinations of starting materials useful to prepare such polymers. More particularly, the invention concerns imparting a desired degree of permanent conductivity to crosslinked polymers simply and accurately during their crosslinking reaction.

BACKGROUND

Crosslinked polymers are useful for many purposes, such as those where structural integrity, resistance to flow, toughness, or durability are important. One significant area of use is in protective or decorative coatings, such as paints. In many such uses (e.g., as paint coatings for electrographic copiers or other electrical apparatus, for aircraft, and for high speed manufacturing apparatus such as photographic coating machines) buildup of electrostatic charges on surfaces coated with such paints could cause serious problems. Many crosslinked polymers having other desirable properties are found to exhibit a relatively high degree of electrical resistivity and thus are susceptible to problems such as undesired accumulation of surface electrostatic charge.

Efforts to lower resistivity (i.e., increase conductivity) of crosslinked polymer compositions have involved various approaches.

One approach involves adding a separate conductivity agent to an otherwise electrically insulative composition comprising a crosslinked polymer to lower the overall resistivity of the composition. However, many conductivity agents (e.g., carbon black or metal particles such as steel or aluminum) can adversely affect other properties of the composition, for example, by imparting undesirable coloration or by changing reflective properties. Other conductivity agents (e.g., some organic compounds containing quaternary ammonium moieties) do not have initial adverse effects, but since they are not permanently anchored in the composition, can evaporate or migrate out of the composition, resulting in a continuous change in the resistivity of the composition over time and possible adverse affects on materials that may come into contact with the migrating agent.

Another approach, which avoids evaporation and migration problems, involves bonding quaternary ammonium conductivity agents or precursors thereof directly into monomers before polymerizing them to form the backbones of the polymer or bonding such agents into the polymer or crosslinking agent before crosslinking. For example, U.K. Pat. No. 2,066,257B, published 3 Aug., 1983, describes epoxy resins having nitrogen atoms as integral parts of the resin backbone. Simultaneous reaction of such an epoxy resin with a crosslinking agent and a quaternizing agent results in crosslinking of the resin and conversion of the nitrogen atoms into quaternary ammonium conductive moieties divalently included in the polymer backbone. U.S. Pat. No. 3,011,918 describes preparing crosslinked vinyl polymers from polymerizable monomers already having been specially prepared having quaternary ammonium moieties bonded covalently and pendently thereto. Also, published abstracts of Japanese published patent applications 59/024706 and 59/024727 (both applications published 8 Feb., 1984) describe polymerizing and crosslinking certain monomers, each of which already contains a quaternary ammonium moiety, to produce conductive crosslinked polymers having such moieties divalently included in the polymer backbones.

However, the schemes described in the above-noted U.K. patent, U.S. patent, and Japanese applications also have drawbacks. They require that specialized polymers or monomers containing the quaternary ammonium moieties or precursors thereof be prepared in separate steps before crosslinking the polymers, thus complicating and lengthening the process of preparation. Furthermore, incorporation of conductive moieties directly into polymer backbones such as in the U.K. patent and Japanese applications, may effect profound changes in other properties of the polymers in addition to resistivity. Also, when using specially modified polymer and monomer starting materials, one has little or no leeway to alter the level of permanent resistivity that the resultant polymer will exhibit after crosslinking; in other words, in order to change the resultant level of resistivity, one must often start at the beginning and fashion new specially modified polymers or monomers to be crosslinked.

The present invention overcomes all of the above-noted prior art problems.

SUMMARY OF THE INVENTION

The invention encompasses new crosslinked polymers and methods and combinations of materials useful for their preparation.

The combination of starting materials essential to the invention comprises:
a polymer,
a crosslinking agent for the polymer, and
a conductivity agent containing a quaternary ammonium moiety and being capable of reacting with the crosslinking agent or the polymer to bond covalently and pendently to the crosslinking agent or the polymer, during a process of crosslinking the polymer through the crosslinking agent.

The process of the invention makes use of the above-noted starting materials and comprises, simultaneously, reacting the polymer with the crosslinking agent to crosslink the polymer through the crosslinking agent, and reacting the crosslinking agent or the polymer with the conductivity agent to bond the conductivity agent covalently and pendently to the crosslinking agent or the polymer.

An inventive product of this process is a new polymer crosslinked through the crosslinking agent and having the conductivity agent bonded covalently and pendently to the crosslinking agent.

The conductivity agent containing the quaternary ammonium moiety imparts a degree of conductivity to the new crosslinked polymers. Because the agent becomes bonded covalently to the backbone or crosslinking portion of the polymer, it forms a permanently fixed part of the crosslinked polymer and will not evaporate or migrate therefrom. Because the agent is pendently bonded to the backbone or crosslinking portion of the polymer, it is much less likely to affect properties of the polymer other than resistivity, compared to prior art schemes wherein quaternary ammonium moieties are divalently incorporated in the polymer chains.

Also, since the conductivity agent becomes bonded to the polymer backbone or crosslinking agent during crosslinking, there is no complicating need to fashion specially modified starting monomers or polymers, and there are no extra steps to be added to the normal crosslinking process. The conductivity agent is simply included in the desired amount in the combination of starting materials and bonds to the polymer backbone or crosslinking agent during the normal process of crosslinking. Furthermore, by simply altering the amount of conductivity agent included in the combination of starting materials, one can conveniently alter the degree of conductivity imparted to the crosslinked polymer without having to alter the initial monomer, polymer or crosslinking agent materials or their amounts in any way, and there is, therefore, also much less chance that properties of the final crosslinked polymer, other than resistivity, will also be altered.

DESCRIPTION OF PREFERRED EMBODIMENTS

The invention is advantageously applicable to virtually any polymer capable of being crosslinked through a crosslinking agent by known methods. In some preferred embodiments involving protective or decorative coating compositions such as paints, preferred polymers include polyester, polyacrylic, polyepoxy, and polyamide polymers and copolymers.

The initial polymer must, in accordance with well-known crosslinking mechanisms, contain at least one functional moiety that is reactive to bond to the crosslinking agent. Such functional moieties include all the moieties known to be functional in this manner, for example, hydroxyl, carboxyl, thiol, epoxide, amide, and amine moieties. In some preferred embodiments, the functional moiety of the polymer is a hydroxyl moiety. For example, when the polymer to be crosslinked is a polyester, its functional moieties can be the result of having used a polyol such as trimethylolpropane in preparing the polyester by condensation of polyacids with polyols, such that two of the three hydroxyl groups of the trimethylolpropane participated in forming backbone ester linkages, and the remaining hydroxyl group is still available to provide a crosslinking site or bonding site for the conductivity agent.

Crosslinking agents useful in accordance with the invention include the chemical compounds known to be useful in general as agents through which polymers can be crosslinked. Such crosslinking agents contain at least two functional moieties to react with functional moieties of the initial polymer chains in order to crosslink the chains through the crosslinking agent. Such crosslinking agent functional moieties include, for example, ether, hydroxyl, carboxyl, isocyanate, and anhydride moieties. In some preferred embodiments the functional moieties of the crosslinking agent are anhydride or ether groups. A specific crosslinking agent included in some preferred embodiments is hexa(methoxymethyl)-melamine.

Another requirement of the invention in regard to the initial polymer and the crosslinking agent, is that, in addition to the functional moieties necessary for crosslinking the polymer through the crosslinking agent, either the polymer or the crosslinking agent or both must contain a moiety functional to react with the conductivity agent in order to bond the conductivity agent covalently and pendently to the polymer backbone or the crosslinking agent during a process of crosslinking the polymer chains. Such a moiety can comprise any of the moieties known to be useful in crosslinking reactions, as described above. For example, when the initial polymer is one containing a hydroxyl moiety, and when the crosslinking agent chosen is hexa(methoxymethyl)-melamine, then there are six ether moities available in the crosslinking agent. At least two of these ether moieties will react with the hydroxyl groups of the polymer chains to crosslink them, but there will still be ether moieties available to react with a functional moiety (e.g., a hydroxyl moiety or thiol moiety) of the conductivity agent in order to bond the conductivity agent pendently to the crosslinking agent during the process of crosslinking.

Conductivity agents useful in accordance with the invention are chemical compounds containing a quaternary ammonium moiety and at least one functional group that is reactive to bond covalently to the crosslinking agent or the polymer. The quaternary ammonium moiety will usually have an anionic material associated with it and thus be in the form of a quaternary ammonium salt. The group in the conductivity agent that is functional to bond to the crosslinking agent or the polymer can be chosen from among the same functional groups described above as useful in crosslinking the polymer through the crosslinking agent. However, the specific functional groups on the polymer or crosslinking agent and the conductivity agent do not have to be the same. In some preferred embodiments the functional group in the conductivity agent is a hydroxyl group. Specific examples of useful conductivity agents are N-butyl-N,N-bis(2-hydroxyethyl)-N-methylammonium bromide and N-decyl-N,N-bis(2-hydroxyethyl)-N-methylammonium bromide.

Other addenda may be included in the combination of starting materials, depending upon the nature in any specific instance of the bonding reactions intended to take place between the polymer and the crosslinking agent and between the conductivity agent and the crosslinking agent or polymer and also depending on the properties and utility desired for the final crosslinked polymer.

Where the combination of starting materials is intended to be used as a coating composition, it will in many cases also include a catalyst for the reactions and a solvent or dispersant medium for the starting materials, the nature of which will depend upon the type of reaction and starting materials. Examples of solvents useful in some of the preferred embodiments are xylene, n-butyl alcohol, toluene, 2-ethoxyethanol, 2-ethoxyethyl acetate, isopropanol, methyl ethyl ketone, 2-propoxyethanol, methyl pyrrolidone, and propylene glycol monomethyl ether acetate. Examples of catalysts useful in some of the preferred embodiments are p-toluenesulfonic acid, dinonylnaphthalene disulfonic acid, and dodecylbenzene sulfonic acid.

In the case where the coating composition is a paint composition it will usually also contain a pigment (e.g., a white pigment such as titanium dioxide) and other well-known desirable additives such as flow control agents and leveling agents.

The process of the invention comprises simply following the normal procedures that are well-known for crosslinking a given polymer with a given crosslinking agent, while the desired amount of appropriate conductivity agent is also included in the combination of starting materials. In the case of some of the paint compositions of the preferred embodiments, the composition is sprayed onto a surface and allowed to dry and cure, sometimes with application of heat to accelerate the process. Multiple coatings can also be used.

An inventive product of this process is a polymer crosslinked through the crosslinking agent and having the conductivity agent bonded covalently and pendently to some or all of the crosslinking chains. Depending upon the nature of functional groups present in the polymer and conductivity agent, some conductivity agent may also become covalently and pendently bonded at other locations on the polymer.

The degree of conductivity (usually expressed in terms of surface resistivity) imparted to the polymer will vary depending upon the amount of conductivity agent included in the combination of starting materials and the inherent properties of the given polymer and crosslinking agent (e.g., the degree of conductivity the crosslinked polymer would have if no conductivity agent were included). In one preferred embodiment the resistivity of a crosslinked polymeric paint coating in accordance with the invention was about $5.5 \times 10^{10}$ ohms per square, while the same crosslinked polymeric paint coating formed without including any conductivity agent had a resistivity higher than $10^{13}$ ohms per square. The conductivity agents useful in the invention have been found effective to improve conductivity of crosslinked polymers when they are included in concentrations of at least 1 percent by weight, based on total polymer weight. In some embodiments conductivity agent is included in concentrations of 1 to 30 percent, and preferably 2-20 percent, by weight.

The following Examples are presented to further illustrate some preferred embodiments of the invention.

The conductivity agent used in the examples was N-butyl-N,N-bis(2-hydroxyethyl)-N-methylammonium bromide.

It was prepared by mixing one mole of N-methyldiethanolamine with one mole of 1-bromobutane, stirring the mixture for 7 hours at a temperature of 95° C., placing the resultant solution under vacuum (0.0133 kPa) for 15 minutes to remove unreacted material, transferring the hot solution to a tin can, and allowing it to cool, whereupon the product crystallized out.

EXAMPLE 1

In this example a typical polyester paint formulation was prepared and coated on a surface as a control and was then compared to the same paint formulation to which had been added a conductivity agent in accordance with the present invention.

Both the inventive and the control paint formulations contained an uncrosslinked polyester resin (Aroplaz TM 6755-A6-80, trademarked by and available from Textron, Inc.) having hydroxyl groups pendently bonded to the polymer backbone, a hexa(methoxymethyl)melamine crosslinking agent, a p-toluene sulfonic acid catalyst, a flow-control agent comprising fluoroaliphatic polymeric esters, a titanium dioxide white pigment, an amorphous silica leveling agent, and various solvents. In addition, the inventive paint formulation contained the conductivity agent, N-butyl-N,N-bis(2-hydroxyethyl)-N-methylammonium bromide. The concentrations of ingredients, expressed as percent by weight of each total paint formulation, are listed in Table I.

TABLE I

| | Weight Percent of inventive paint | Weight Percent of control paint |
|---|---|---|
| polyester resin | 32.08 | 33.36 |
| hexa(methoxymethyl)-melamine | 10.58 | 11.00 |
| p-toluene sulfonic acid | 0.09 | 0.09 |
| fluoroaliphatic polymeric esters | 0.43 | 0.45 |
| titanium dioxide | 27.99 | 29.11 |
| amorphous silica | 3.85 | 4.00 |
| xylene | 0.58 | 0.60 |
| butyl alcohol | 1.92 | 2.00 |
| toluene | 2.87 | 2.93 |
| 2-ethoxyethyl acetate | 5.21 | 5.42 |
| isopropyl alcohol | 0.13 | 0.14 |
| propylene glycol monomethyl ether acetate | 10.48 | 10.90 |
| N—butyl-N, N—bis(2-hydroxyethyl)-N—methylammonium bromide | 3.85 | 0 |

For each paint formulation, the ingredients were mixed together with stirring and applied to a flat surface by spraying (to a dry film thickness of 30.5 micrometers). Each coating was heated to 135° C. for 20 minutes to accelerate the crosslinking reaction and, in the case of the inventive paint, the bonding reaction between the conductivity and crosslinking agents.

Surface resistivities of the two coated surfaces were then measured. The surface coated with the control paint exhibited a surface resistivity of $1.3 \times 10^{13}$ ohms per square, while the surface coated with the inventive paint exhibited a surface resistivity of $5.5 \times 10^{10}$ ohms per square.

EXAMPLE 2

In this example a typical polyacrylic paint formulation was prepared and coated on a surface as a control and was then compared to the same paint formulation to which had been added a conductivity agent in accordance with the present invention.

Both the inventive and the control paint formulations contained a thermosetting acrylic resin having functional hydroxyl groups pendently bonded to the polymer backbone, a crosslinking agent comprising a resin having anhydride functional groups, a white pigment composition containing titanium dioxide, various leveling agents, and solvents such as methyl pyrrolidone and cellosolve. In addition, the inventive paint formulation contained the conductivity agent, N-butyl-N,N-bis-(2-hydroxyethyl)-N-methylammonium bromide. The concentrations of ingredients, expressed as percent by weight of each total paint formulation, are listed in Table II.

TABLE II

| Ingredient | Weight percent of inventive paint | Weight percent of control paint |
|---|---|---|
| Thermosetting acrylic resin | 33.43 | 34.79 |
| Crosslinking agent | 4.18 | 4.35 |
| White pigment composition | 25.07 | 26.09 |
| Leveling agents | 25.06 | 26.08 |
| Solvents | 8.36 | 8.70 |
| Conductivity agent | 3.90 | 0 |

For each paint formulation, the ingredients were mixed together with stirring and applied to a flat surface by spraying (to a dry film thickness of 30.5 micrometers). Each coating was allowed to air set for 15 minutes and was then heated to 82° C. for 20 minutes and finally heated to 163° C. for 20 minutes.

Surface resistivities of the two coated surfaces were then measured. The surface coated with the control paint exhibited a surface resistivity on the order of $10^{13}$ ohms per square, while the surface coated with the inventive paint exhibited a surface resistivity on the order of $10^9$ ohms per square.

The invention has been described in detail with particular reference to certain preferred embodiments thereof, but it should be understood that variations and modifications can be effected within the spirit and scope of the invention.

What is claimed is:

1. A combination of materials comprising:
   a polymer containing at least one functional moiety capable of reacting to bond to a crosslinking agent,
   a crosslinking agent for the polymer, and
   a conductivity agent containing a quaternary ammonium moiety and being capable of reacting with the crosslinking agent or the polymer to bond covalently and pendently to the crosslinking agent or the polymer, during a process of crosslinking the polymer through the crosslinking agent.

2. The combination as defined in claim 1, further comprising a catalyst for the crosslinking process.

3. The combination as defined in claim 2, further comprising a solvent for the polymer.

4. The combination as defined in claim 3, further comprising a pigment.

5. A combination as defined in claim 1, wherein the polymer is a polyester or polyacrylic polymer.

6. The combination as defined in claim 1, wherein the conductivity agent contains a hydroxyl moiety functional to react with the crosslinking agent or the polymer.

7. The combination as defined in claim 1, wherein the crosslinking agent contains at least three ether moieties, at least two of which are functional to react with the polymer and at least one of which is functional to react with the conductivity agent.

8. The combination as defined in claim 1, wherein the crosslinking agent comprises hexa(methoxymethyl)-melamine.

9. The combination as defined in claim 1, wherein the conductivity agent is N-butyl-N,N-bis(2-hydroxyethyl)-N-methylammonium bromide or N-decyl-N,N-bis(2-hydroxyethyl)-N-methylammonium bromide.

10. A polymer crosslinked through a crosslinking agent and having a conductivity agent that contains a quaternary ammonium moiety and is bonded covalently and pendently to the crosslinking agent.

11. A process comprising subjecting the combination of materials described in claim 1 to conditions sufficient to simultaneously crosslink the polymer through the crosslinking agent and bond the conductivity agent covalently and pendently to the crosslinking agent or the polymer.

* * * * *